US008649287B2

(12) United States Patent
Hwang et al.

(10) Patent No.: US 8,649,287 B2
(45) Date of Patent: Feb. 11, 2014

(54) APPARATUS AND METHOD FOR DETECTING INTERFERENCE IN HETEROGENEOUS NETWORK OF MOBILE COMMUNICATION SYSTEM

(75) Inventors: Sang-Yun Hwang, Seoul (KR); Chul-Jin Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 13/055,522

(22) PCT Filed: Jul. 23, 2009

(86) PCT No.: PCT/KR2009/004102
§ 371 (c)(1),
(2), (4) Date: Jan. 24, 2011

(87) PCT Pub. No.: WO2010/011091
PCT Pub. Date: Jan. 28, 2010

(65) Prior Publication Data
US 2011/0122795 A1  May 26, 2011

(30) Foreign Application Priority Data

Jul. 24, 2008  (KR) .................. 10-2008-0072054
Jul. 21, 2009  (KR) .................. 10-2009-0066275

(51) Int. Cl.
*H04L 12/26* (2006.01)
(52) U.S. Cl.
USPC .................................. 370/252; 370/338
(58) Field of Classification Search
None
See application file for complete search history.

(56) References Cited

U.S. PATENT DOCUMENTS

| 7,734,253 | B2 * | 6/2010 | Chen et al. | 455/41.2 |
| 8,144,572 | B2 * | 3/2012 | Shoemake et al. | 370/208 |
| 8,223,901 | B2 * | 7/2012 | Huttunen et al. | 375/346 |
| 2008/0310486 | A1 * | 12/2008 | Zhu et al. | 375/149 |

FOREIGN PATENT DOCUMENTS

| KR | 10-0301726 B1 | 9/2001 |
| KR | 10-2004-0095606 A | 11/2004 |
| KR | 10-0626196 B1 | 9/2006 |
| KR | 10-2007-0096491 A | 10/2007 |
| KR | 10-2008-0051494 A | 6/2008 |
| KR | 10-2008-0099304 A | 11/2008 |

\* cited by examiner

Primary Examiner — Min Jung
(74) Attorney, Agent, or Firm — Jefferson IP Law, LLP

(57) ABSTRACT

An apparatus and a method for detecting interference in a heterogeneous system of a mobile communication system that uses an Industrial, Scientific and Medical (ISM) band are provided. More particularly, an apparatus and a method for determining a start section and an end section of a packet using an Automatic Gain Control (AGC) change in a Zigbee communication system that uses an ISM band and detecting interference in a heterogeneous system using a reception rate of a packet and an interference occurrence rate depending on whether a synchronization process is performed during the determined section. The apparatus includes an interference detector. The interference detector determines a reception section of a packet by determining a start and an end of the received packet, determines whether a packet is synchronized during the determined section, and determines interference occurrence and a packet reception rate depending on whether the packet is synchronized.

10 Claims, 5 Drawing Sheets

APPARATUS AND METHOD FOR DETECTING INTERFERENCE IN HETEROGENEOUS NETWORK OF MOBILE COMMUNICATION SYSTEM

PRIORITY

This application claims the benefit under 35 U.S.C. §119 (a) of a Korean patent application filed in the Korean Intellectual Property Office on Jul. 21, 2009 and assigned Serial No. 10-2009-0066275 and a Korean patent application filed in the Korean Intellectual Property Office on Jul. 24, 2008, the entire disclosure of both of which are hereby incorporated by reference.

BACKGROUND OF THE INVENTION

1. Field of the Invention

The present invention relates to an apparatus and a method for detecting interference in a heterogeneous system of a mobile communication system that uses an Industrial, Scientific and Medical (ISM) band. More particularly, the present invention relates to an apparatus and a method for determining a start section and an end section of a packet using an Automatic Gain Control (AGC) change in a Zigbee communication system that uses an ISM band and detecting interference in a heterogeneous system using a reception rate of a packet and an interference occurrence rate depending on whether a synchronization process is performed during the determined section.

2. Description of the Related Art

Recently, as mobile communication develops rapidly, particularly a mobile terminal that enables wireless voice communication and information exchange has become a necessity. In an early stage of a mobile terminal, the mobile terminal has been simply recognized as a terminal that can be carried with and enables wireless communication, but as a technology of the mobile terminal develops and a wireless Internet is introduced, the mobile terminal is not only used for the purpose of simple telephone communication and schedule management, but also expands its utilization range such as capturing an image using a built-in camera, viewing satellite broadcasting, games, and a remote controller using short distance communication.

The short distance communication of the above described functions is a function of providing an advantage of being able to communicate with a peripheral apparatus. A manufacturer of a mobile terminal brings a mobile terminal that includes a short distance communication function such as Bluetooth, Zigbee, Ultra-Wideband (UWB), Wireless Local Area Network (WLAN), Rubee, and the like, to the market.

The Zigbee of the above-described short distance communication technologies is a communication scheme that uses an ISM band, and can provide a data speed of 250 kbps at the maximum and can configure a network of 65,535 sensors at the maximum.

However, since the Zigbee communication uses the ISM band, a communication problem by interference by a heterogeneous system, for example, a wireless LAN or Bluetooth may be generated. Therefore, Zigbee communication needs to select a frequency channel where interference is relatively small in order to guarantee stable data transmission/reception. At this point, the mobile terminal determines a channel where interference is small through the following interference component detecting method.

A first method determines that interference exists when a Received Signal Strength Indication (RSSI) level of a reception signal exceeds a specific threshold. A second method determines that Zigbee signals exist in a frequency channel currently in use when a start-of-frame delimiter (SFD) of a Zigbee packet is received even though RSSI does not exceed a threshold. A last method of detecting an interference component determines that Zigbee signals exist in a frequency channel currently in use when RSSI exceeds a threshold and an SFD is received.

However, of the above methods, the RSSI measuring method cannot determine whether a heterogeneous system besides a Zigbee system exists in a current channel, and the method of determining whether a Zigbee packet exists has a problem of having to constantly maintaining an operation for receiving the packet, that is, a reception mode state.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for detecting interference of a heterogeneous system in a mobile communication system of an ISM band.

Another aspect of the present invention is to provide an apparatus and a method for determining a start and an end of a packet using an AGC gain change in a mobile terminal that supports an ISM band.

Still another aspect of the present invention is to provide an apparatus and a method for detecting interference of a heterogeneous system using a reception rate of a packet and an interference occurrence rate depending on whether a synchronization process is performed during a packet reception section in a mobile terminal that supports an ISM band.

In accordance with an aspect of the present invention, an apparatus for detecting interference of a heterogeneous network in a mobile communication system is provided. The apparatus includes an interference detector for determining a reception section of a packet by determining a start and an end of the received packet, determining whether a packet is synchronized during the determined section, and determining interference occurrence and a packet reception rate depending on whether the packet is synchronized.

In accordance with another aspect of the present invention, a method for detecting interference of a heterogeneous network in a mobile communication system is provided. The method includes determining a reception section of a packet by determining a start and an end of the received packet, determining whether the packet is synchronized during the determined section, and determining interference occurrence and a packet reception rate depending on whether the packet is synchronized.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for determining a start section and an end section of a packet using an Automatic Gain Control (AGC) change in a Zigbee communication system that uses an ISM band and detecting interference in a heterogeneous system using a reception rate of a packet and an interference occurrence rate depending on whether a synchronization process is performed during the determined section.

Additionally, the following description is made on the assumption that a mobile terminal includes a mobile communication terminal that enables video communication such as an International Mobile Telecommunication-2000 (IMT-2000) terminal, a 4$^{th}$ generation broadband system terminal, and a mobile communication terminal such as a Personal Data Assistant (PDA), and the mobile terminal is a terminal that supports an ISM band.

Figure 1:
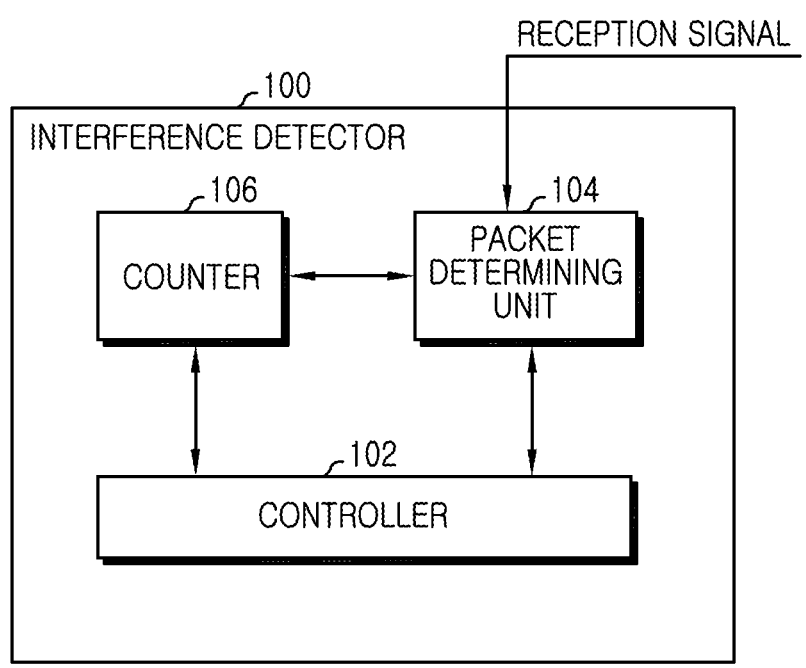
FIG. 1 is a block diagram illustrating an interference detector of a mobile terminal for detecting interference of a heterogeneous system according to an exemplary embodiment of the present invention.

FIG. 1 is a block diagram illustrating in detail an interference detector of a mobile terminal for detecting interference of a heterogeneous system according to an exemplary embodiment of the present invention.

Referring to FIG. 1, the interference detector 100 may include a controller 102, a packet determining unit 104, and a counter 106.

According to an exemplary embodiment of the present invention, the controller 102 of the interference detector 100 determines a start and an end of a packet received by a mobile terminal that supports a Zigbee system, and determines whether interference is detected using whether packet synchronization is successful during the determined section.

An operation of the controller 102 is described below in more detail.

The controller 102 of the interference detector 100 determines a start and an end of a received packet using an AGC gain change, and then determines an SFD informing a frame start when a Zigbee packet is received, and determines whether packet synchronization is successful during the determined start section and end section of the packet to determine whether interference of a heterogeneous system exists. For example, when detecting a field informing a frame start, the controller 102 determines that a packet synchronization is successful to determine a packet reception rate through a Cyclic Redundancy Check (CRC) test. When not detecting the field informing the frame start, the controller 102 may determine a synchronization failure to determine interference occurrence.

At this point, the controller 102 determines the interference occurrence and the packet reception rate until a reception signal that can determine that information determining interference of a heterogeneous system is sufficiently determined is received.

After that, the controller 102 detects the interference of the heterogeneous system using the interference occurrence and the packet reception rate.

The packet determining unit 104 determines a field informing a frame start when receiving the Zigbee packet to determine whether packet synchronization is successful under control of the controller 102, and then determines interference occurrence and a packet reception rate to provide the same to the counter 106.

The counter 106 counts the number of received Zigbee packets, the number of interferences determined by the packet determining unit 104, and the number of packet reception failures.

That is, the controller 102 of the interference detector 100 controls the packet determining unit 104 to determine a reception rate of a received Zigbee packet and interference occurrence, and processes to detect the interference of the heterogeneous system using the number of interferences counted by the counter 106 and the number of packet reception failures (packet reception rate).

The functions of the counter 106 and the packet determining unit 104 of the interference detector 100 may be performed by the controller 102 of the interference detector 100 of the mobile terminal. The separate configuration and illustration of the counter 106 and the packet determining unit 104 are an exemplary purpose only for inconvenience in description, not for limiting the scope of the present invention. It would be obvious to those skilled in the art that various modifications may be made within the scope of the present invention. For example, all of the functions of the counter 106 and the packet determining unit 104 may be processed by the controller 102.

Up to now, an apparatus for determining a start section and an end section of a packet using an Automatic Gain Control (AGC) change in a Zigbee communication system that uses an ISM band, and detecting interference in a heterogeneous system using a reception rate of a packet and an interference occurrence rate depending on whether a synchronization process is performed during the determined section has been described. Hereinafter, a method for detecting interference of a heterogeneous system using a reception rate of a packet and an interference occurrence rate depending on whether a synchronization process is performed during a start section and an end section of the packet in a Zigbee communication system that uses an ISM band using the apparatus according to an exemplary embodiment of the present invention is described.

Figure 2:
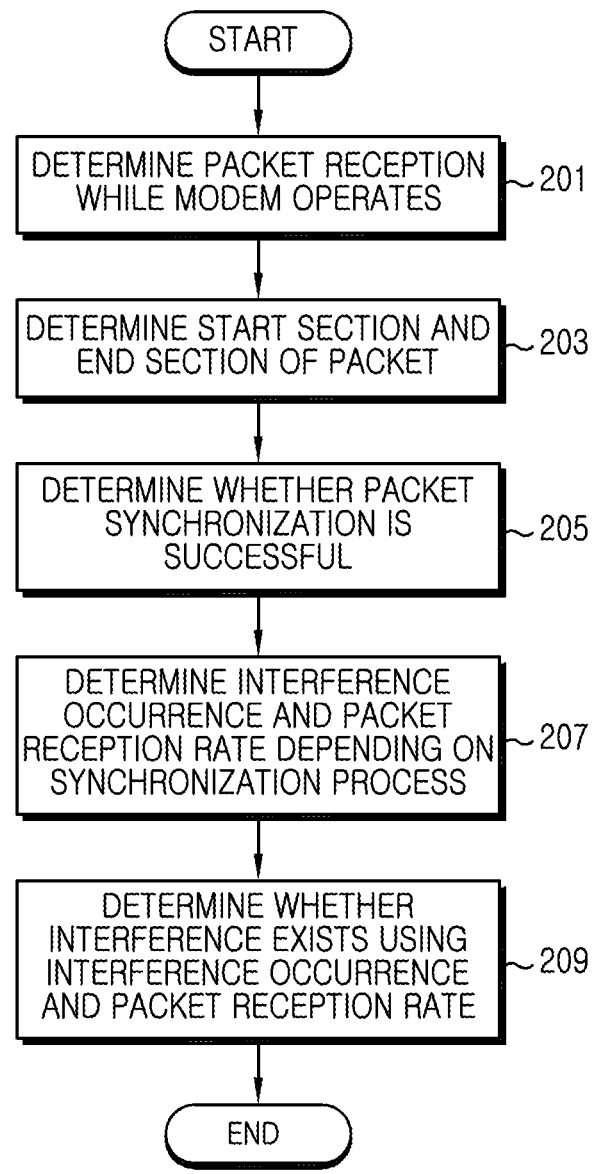
FIG. 2 is a flowchart for detecting interference of a heterogeneous system in a mobile terminal according to an exemplary embodiment of the present invention.

FIG. 2 is a flowchart for detecting interference of a heterogeneous system in a mobile terminal according to an exemplary embodiment of the present invention.

Referring to FIG. 2, the mobile terminal determines reception of a Zigbee packet in step 201, and determines a start and an end of the received Zigbee packet in step 203. At this point, the mobile terminal may determine the start section and the end section of the packet using an AGC gain change, and processes to operate a modem only when receiving the Zigbee packet to reduce power consumption of the mobile terminal. The mobile terminal determines whether synchronization of the received packet is successful in step 205, and determines interference occurrence and a packet reception rate depending on whether the synchronization process is successful in step 207. At this point, the mobile terminal determines whether the synchronization of a packet is successful during the determined section, and determines interference occurrence and a packet reception rate.

The mobile terminal proceeds to step 209 to determine whether interference exists using the interference occurrence and the packet reception rate determined in step 207.

That is, according to an exemplary embodiment of the present invention, the mobile terminal determines a start and an end of a received packet using an AGC change, and detects interference using whether the synchronization process is successful during the start and the end of the packet, that is, the packet reception section.

Here, the mobile terminal may determine the reception rate by determining packet reception failure for a predetermined number of reception signals.

That is, when determining interference occurrence of a predetermined threshold or more, or a reception rate of a predetermine threshold or less (the number of packet reception failures of the threshold or more) from a predetermined number of reception signals, the mobile terminal may determine interference of the heterogeneous system. In contrast, when determining interference occurrence of a predetermined threshold or less, or a reception rate of a predetermine threshold or more (the number of packet reception failures of the threshold or less) from a predetermined number of reception signals, the mobile terminal may determine that there is no interference of the heterogeneous system.

After that, the mobile terminal ends the present algorithm.

An exemplary embodiment of detecting interference of a heterogeneous system in the mobile terminal is described in more detail with reference to FIG. 3.

Figure 3A:
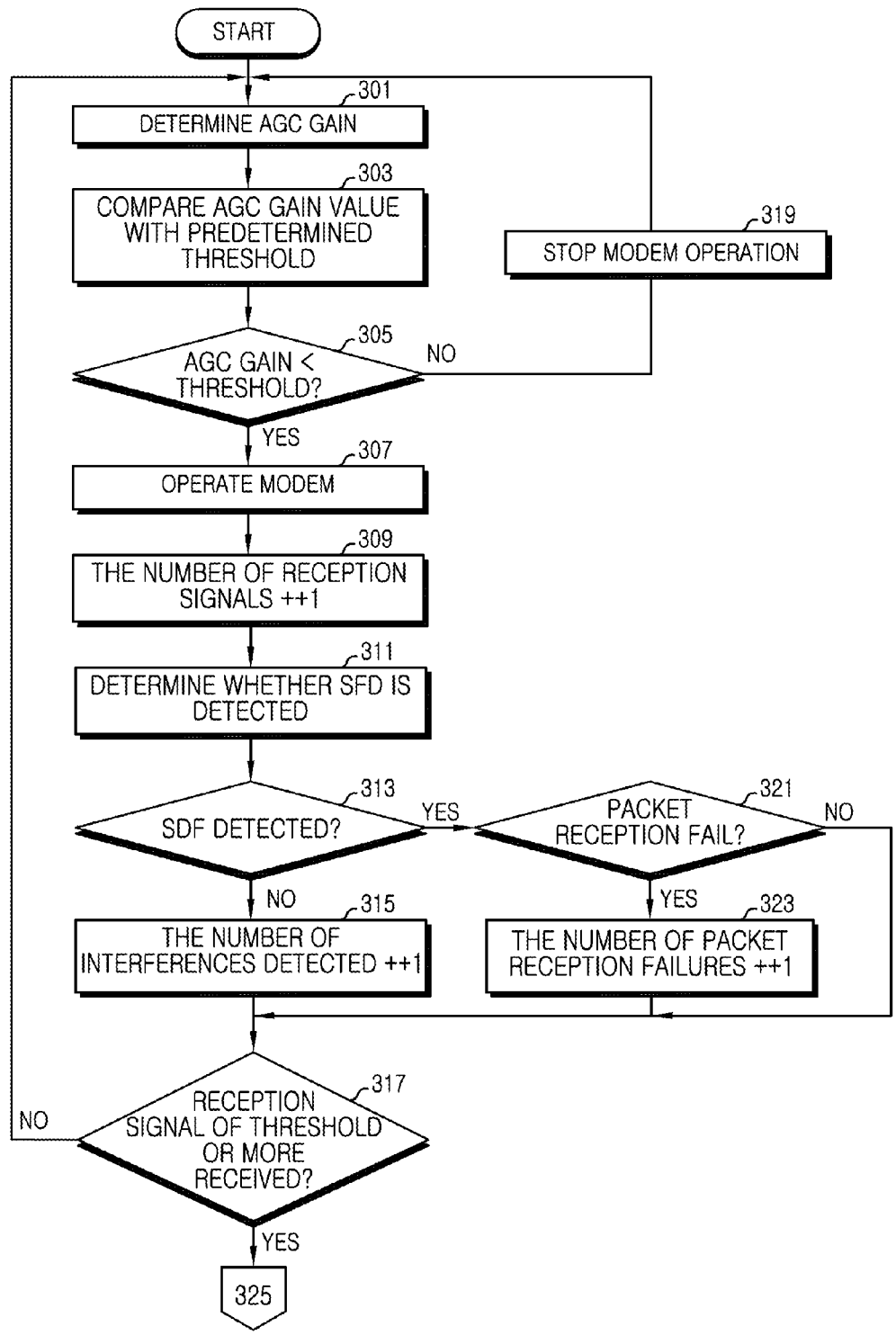
FIG. 3 is a flowchart illustrating a process for detecting interference of a heterogeneous system in a mobile terminal according to an exemplary embodiment of the present invention.
Figure 3B:
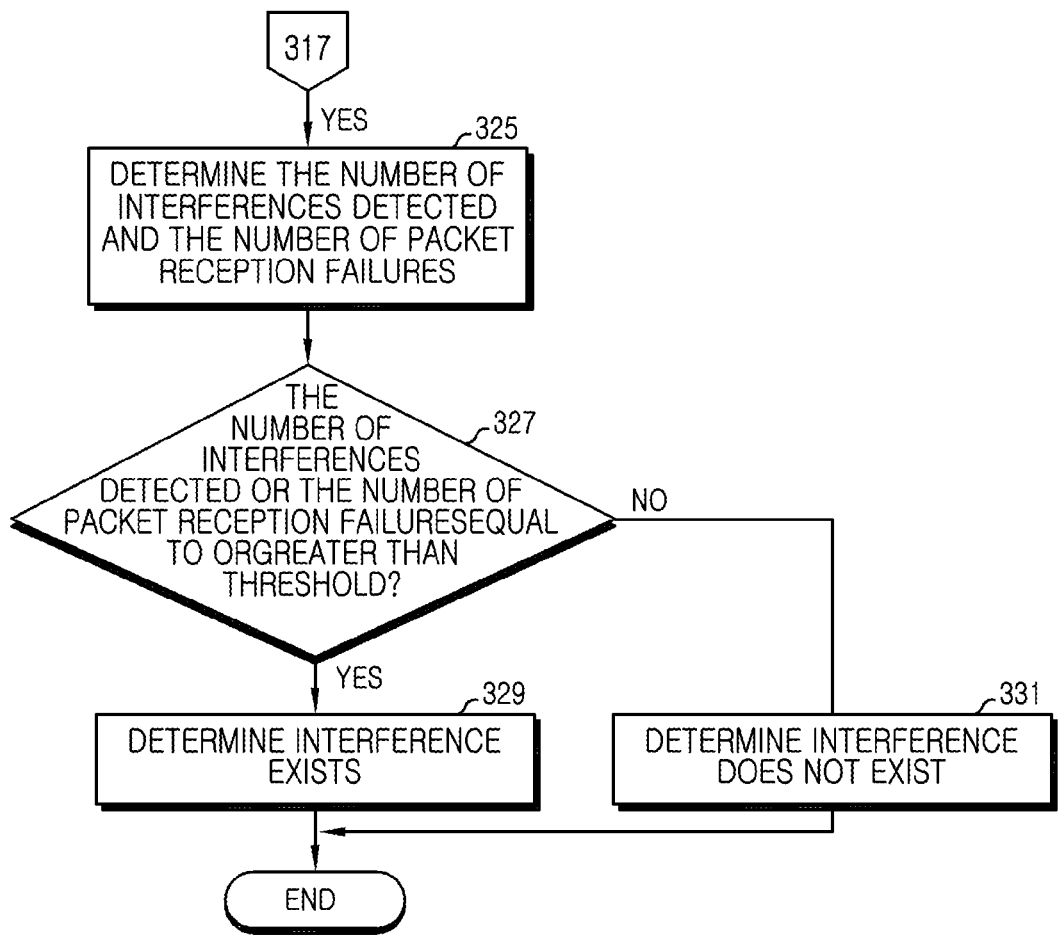

FIG. 3 is a flowchart illustrating a process for detecting interference of a heterogeneous system in a mobile terminal according to an exemplary embodiment of the present invention. The process for detecting interference of the heterogeneous system in the mobile terminal is divisionally described in the process of FIG. 3A and the process of FIG. 3B. The divisions of FIGS. 3A and 3B are considered as one drawing of FIG. 3.

Referring to FIG. 3, in case of intending to detect interference of a heterogeneous system, the mobile terminal initializes (sets to "0") the number of reception signals (#RxSigCnt), the number of interference detections (InterferenceDetect), and the number of packet reception failures (#CRCBad) suggested by an exemplary embodiment of the present invention.

The mobile terminal determines an AGC gain in step 301, and proceeds to step 303 to compare the AGC gain determined in step 301 with a predetermined threshold. Here, the predetermined threshold that is compared with the AGC gain denotes a reference value for determining a start and an end of packet reception.

Here, when there is no reception signal, the interference detector of the mobile terminal will maintain an AGC gain at the maximum value in order to amplify a noise component. At this point, when receiving a packet (assumed as a Zigbee packet hereinafter) having power of noise power (pNoiseLevel), the interference detector controls an AGC gain to a value lower that the noise power.

The mobile terminal that has performed the operation of comparing the AGC gain with the predetermined threshold in step 303 determines a start and an end of a received packet in step 305.

When determining that the AGC gain is less than the predetermined threshold in step 305, the mobile terminal determines that packet reception has ended and proceeds to step 319 to operate a modem. By doing so, the modem is allowed to operate only when a packet is received, so that the system may operate at low power while performing an interference detecting process.

In contrast, when determining that the AGC gain is equal to or greater than the predetermined threshold in step 305, the mobile terminal determines that it is receiving a packet, that is, it is in a section between the start and the end of a received packet and proceeds to step 307 to operate the modem, and increases the number of reception signals by 1 (#RxSigCnt++) in step 309.

The mobile terminal determines a received Zigbee packet to determine whether a field informing a frame start is detected in step 311. The operation of determining whether the field informing the frame start is detected denotes an operation of determining whether a packet synchronization process has been performed.

The mobile terminal proceeds to step 313 to determine a result of step 311.

When not detecting the field informing the frame start in step 313, the mobile terminal determines that interference has been detected according to a synchronization failure and increases the number of interference occurrences (#InterferenceDetect++) in step 315.

When detecting the field informing the frame start in step 313, the mobile terminal determines whether packet reception is successful in step 321. At this point, when determining a packet reception failure in step 321, that is, when determining the Zigbee packet and detecting the field informing the frame start to determine that synchronization is successful but failing to receive a packet due to occurrence of a CRC error, the mobile terminal proceeds to step 323 to increase the number of packet reception failures (#CRCBad++). In contrast, when determining that the packet reception is successful in step 321, the mobile terminal compares the number of received signals with a predetermined threshold in step 317. The mobile terminal that has determined whether the field informing the frame start is detected compares the number of received signals with the predetermined threshold in step 317. Here, the predetermined threshold denotes a value for determining interference of a heterogeneous system. That is, the mobile terminal determines whether interference of the heterogeneous system exists using interference for a reception signal and a packet reception rate of a predetermined threshold or more.

When not receiving a reception signal of a predetermined threshold or more in step 317, the mobile terminal repeatedly performs the operation of step 301 in order to determine interference and a packet reception rate for determining whether interference of a heterogeneous system exists.

In contrast, when receiving a reception signal of a predetermined threshold or more in step 317, the mobile terminal performs an operation of determining whether interference of a heterogeneous system is detected in step 325. That is, the mobile terminal performs the process of FIG. 3B in order to determine interference for a reception signal of a predetermined threshold or more and a packet reception rate to determine whether the interference is detected.

When the mobile terminal proceeds to step 327 to determine that the interference for the reception signal and a packet reception rate are greater than the predetermined threshold, which is a reference value for determining whether the interference is detected, as a result of the process of step 325, the mobile terminal determines that the interference of the heterogeneous exists in step 329.

In contrast, when the mobile terminal proceeds to step 327 to determine that the interference for the reception signal and the packet reception rate are less than the predetermined threshold as a result of the process of step 325, the mobile terminal determines that the interference of the heterogeneous does not exist in step 331.

After that, the mobile terminal ends the present algorithm.

Figure 4:
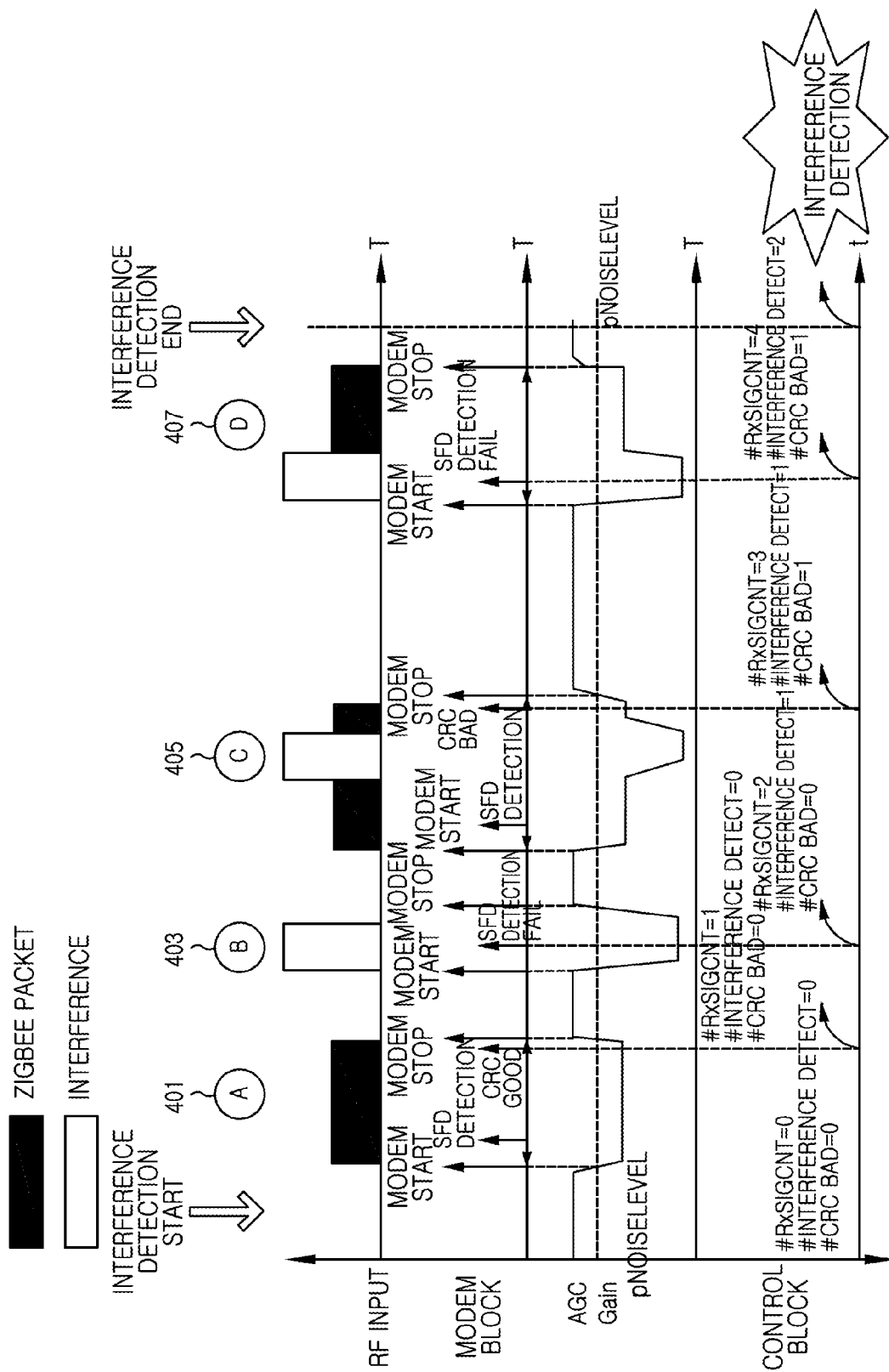
FIG. 4 is a view illustrating a process for detecting interference of a heterogeneous system in a mobile terminal according to an exemplary embodiment of the present invention.

FIG. 4 is a view illustrating a process for detecting interference of a heterogeneous system in a mobile terminal according to an exemplary embodiment of the present invention. FIG. 4 is a view illustrating the process for detecting interference of the heterogeneous system along a time flow according to an exemplary embodiment of the present invention.

As illustrated in FIG. 4, the process for detecting the interference of the heterogeneous system may be described with reference to four following cases.

A first case of receiving a Zigbee packet and a second case of receiving an interference signal, and a third case where interference overlaps a Zigbee packet are divisionally described. The third case denotes a case where interference overlaps the Zigbee packet, and may be divided into a case where the interference overlaps the front portion of the packet and a case where the interference overlaps the rear portion of the packet.

In the case where the mobile terminal performs a function of detecting interference of a heterogeneous system, the mobile terminal initializes (sets to "0") the number of reception signals (#RxSigCnt), the number of interference detections (InterferenceDetect), and the number of packet reception failures (#CRCB ad).

After that, when not detecting a reception signal, the mobile terminal maintains a gain value of an AGC at the maximum value to amplify a noise component.

At this point, when receiving a Zigbee packet having power of noise power (pNoiseLevel) or more, the mobile terminal controls an AGC gain value to an AGC gain value lower than the noise power.

At this point, when determining an AGC gain of a threshold or more, the mobile terminal determines that a meaningful reception signal has been received and operates a modem. In contrast, when determining that an AGC gain value is equal to or less than the threshold, the mobile terminal determines that current signal reception has ended to stop the modem operation.

After that, the mobile terminal determines whether an SFD of a received signal is detected and whether packet reception is successful.

At this point, at a state (401) of receiving the Zigbee packet, when both the SFD detection (determination of interference occurrence depending on whether synchronization is performed) and the packet reception are successful, the mobile terminal sets the number of reception signals (#RxSigCnt), the number of interference detections (InterferenceDetect), and the number of packet reception failures (#CRCBad).

That is, when the SFD is detected, the mobile terminal determines that interference has not been detected and thus determines that packet reception has not failed, and sets values of #RxSigCnt=1, #InterferenceDetect=0, and #CRCBad=0.

When receiving (403) an interference signal, that is, receiving interference of a heterogeneous system, the mobile terminal fails to detect the SFD and thus increases the number of interference detections (#InterferenceDetect) by '1'.

When not detecting the SFD under the above circumstance, the mobile terminal determines that the packet reception is successful and does not increase the number of packet reception failures (#CRCBad).

Therefore, the mobile terminal sets values of #RxSigCnt=2, #InterferenceDetect=1, and #CRCBad=0.

In the case where a heterogeneous system signal overlaps (405) the rear portion of the Zigbee packet, since the SFD is located in the front portion of the Zigbee packet, packet detection fails due to the heterogeneous system interference that overlaps the rear portion of the packet though the SFD has been detected. Thus, the mobile terminal does not update #InterferenceDetect but increases a value of #CRCBad. Therefore, #RxSigCnt=3, #Interference Detect=1, and #CRCBad=1.

Lastly, in the case where a heterogeneous system signal overlaps (407) in front of a Zigbee packet, the mobile terminal increases a value of #InterferenceDetect by '1', and does not increase #CRCBad. Therefore, #RxSigCnt=4, #InterferenceDetect=2, and #CRCBad=1.

In the case where a threshold for a transmission signal is set to 3, a threshold for the number of interferences is set to 1, and a threshold for the number of packet reception failures is set to 1, the mobile terminal compares #RxSigCnt=4, #InterferenceDetect=2, and #CRCBad=1 with the thresholds to determine whether interference of a heterogeneous system exists.

That is, the mobile terminal determines that interference of a heterogeneous system exists by determining interference of a threshold or more.

As described above, an exemplary embodiment of the present invention is for detecting interference of a heterogeneous system using a reception rate and interference depending on whether packet synchronization is successful during a Zigbee packet reception section in a Zigbee communication system that uses an ISM band. An exemplary embodiment of the present invention may detect interference of a heterogeneous system by determining whether interference of the heterogeneous system exists without measuring an RSSI and while not transmitting a separate packet. In addition, since an exemplary embodiment of the present invention operates a modem only while a packet is received, the system may operate at low power while performing an interference detecting process.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for detecting interference of a heterogeneous network in a mobile communication system, the apparatus comprising:
   an interference detector for detecting a received packet in the heterogeneous network by determining a start and an end of the received packet, determining whether the received packet is synchronized, and determining an interference occurrence rate and a packet reception rate based on whether the packet is synchronized.

2. The apparatus of claim 1, wherein the interference detector determines the interference occurrence rate and the packet reception rate until an amount of information for determining interference of the heterogeneous network has reached a threshold, and determines the existence of interference in the heterogeneous network using the interference occurrence rate and the packet reception rate.

3. The apparatus of claim 1, wherein the interference detector detects the received packet by determining a start and an end of the received packet using an Automatic Gain Control (AGC) gain change.

4. The apparatus of claim 1, wherein the interference detector determines whether a packet is synchronized by determining whether a field (start-of-frame delimiter (SFD)) informing a frame start is detected.

5. The apparatus of claim 4, wherein when not detecting the field informing the frame start, the interference detector determines the interference occurrence rate, and when detecting the field informing the frame start, the interference detector determines whether packet reception is successful through a Cyclic Redundancy Check (CRC) test to determine the packet reception rate.

6. A method for detecting interference of a heterogeneous network in a mobile communication system, the method comprising:
   detecting a received packet in the heterogenous network by determining a start and an end of the received packet;
   determining whether the received packet is synchronized; and
   determining an interference occurrence rate and a packet reception rate based on whether the packet is synchronized.

7. The method of claim 6, further comprising:
   determining the interference occurrence rate and the packet reception rate until an amount of information for determining interference of the heterogeneous network reaches a threshold; and
   determining the existence of in interference of the heterogeneous network using the interference occurrence rate and the packet reception rate upon reaching the threshold.

8. The method of claim 6, wherein the detectin of the received packet by determining the start and the end of the received packet comprises:
   determining the received packet using an AGC gain change.

9. The method of claim 6, wherein the determining of whether the packet is synchronized comprises determining whether a field (start-of-frame delimiter (SFD)) informing a frame start is detected.

10. The method of claim 9, wherein the determining of the interference occurrence rate and the packet reception rate based on whether the packet is synchronized comprises:
    when not detecting the field informing the frame start, determining the interference occurrence rate; and
    when detecting the field informing the frame start, determining whether packet reception is successful through a CRC test.

* * * * *